United States Patent Office 3,013,845
Patented Dec. 19, 1961

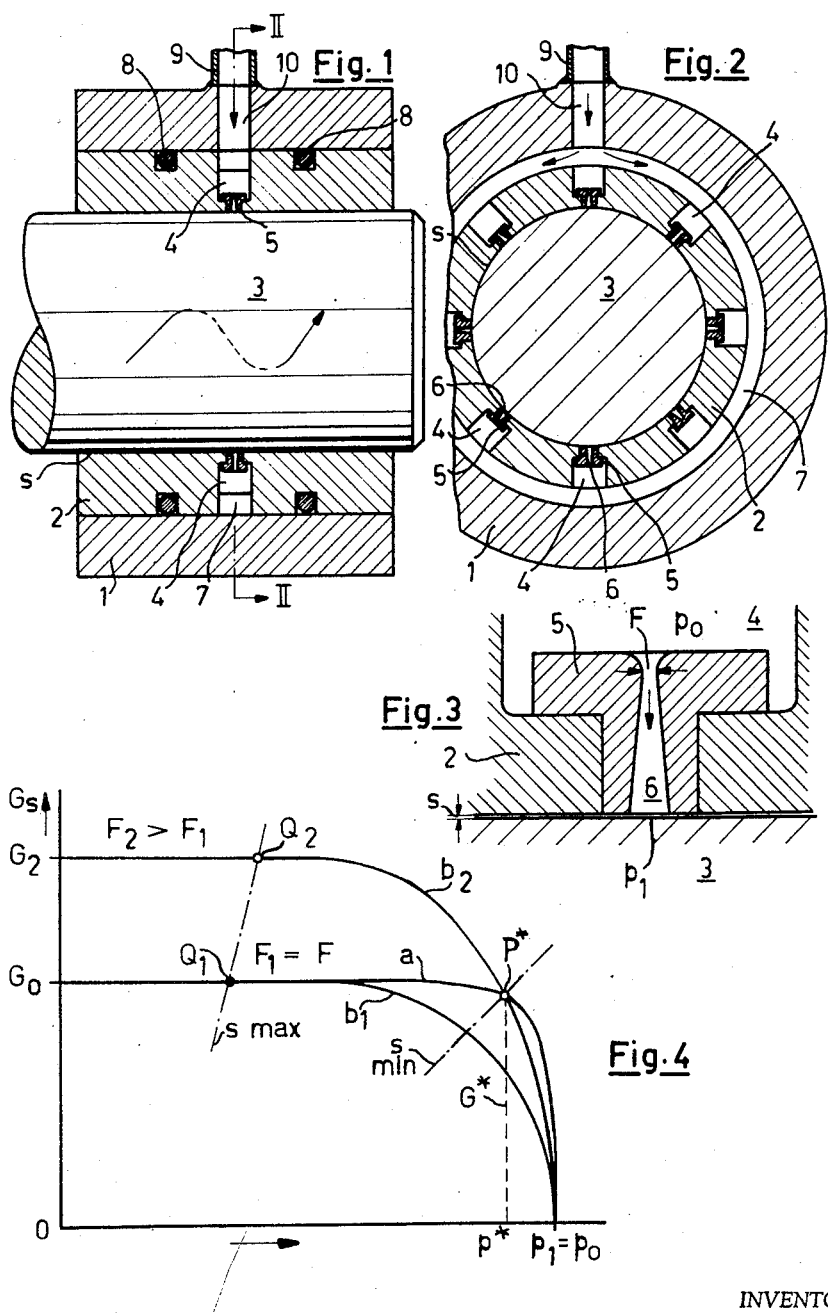

3,013,845
SUPPLYING SUPPORTING GAS TO A GAS
PRESSURE BEARING
Erwin Loch, Zurich, Switzerland, assignor to Escher Wyss
Aktiengesellschaft, Zurich, Switzerland, a corporation
of Switzerland
Filed June 8, 1960, Ser. No. 34,775
Claims priority, application Switzerland June 26, 1959
3 Claims. (Cl. 308—9)

In aerostatic bearings, compressed gas, taken from a source situated outside the bearing, is supplied to the bearing gap through one or more supply nozzles. From the supply points, the gas flows away through the bearing gap. The supply nozzles throttle the incoming gas and their purpose is to restrict the quantity of gas passing through, so that the pressure in the bearing gap varies as a function of the size of the gap, and for given bearing load, a definite equilibrium position of the shaft is established.

In the types of aerostatic bearings known heretofore, the supply nozzles are in the form of cylindrical bores or annular gaps with parallel walls. With these nozzles, it is a disadvantage that for given inlet pressure, the flow quantity falls off comparatively rapidly when the back-pressure rises above the critical pressure, at which the velocity in the nozzle is that of sound. The back-pressure, however, corresponds to the inlet pressure of the bearing gap, and it is of interest to select this as close as possible to the available pressure of the bearing gas source, so as to obtain a high supporting capacity of the bearing. With given minimum bearing gap, the flow quantity is then also determined, and due to the drop in quantity with increasing back-pressure, it is necessary to select a comparatively large cross-section for the supply nozzle. This is not only accompanied by the disadvantage that a comparatively large quantity of gas leaves on the opposite side of the bearing, on which the gap is larger, but it also impairs the stability, since the back-pressure of the nozzle and hence the gas pressure in the bearing gap become less sensitive to variations in gap width.

The invention now relates to a device for the supply of supporting gas to the bearing gap of an aerostatic bearing, in which the gas is supplied to the bearing gap by one or more supply nozzles. The above-mentioned disadvantages are obviated according to the invention by the supply nozzle being constructed as a Laval nozzle.

In the case of these nozzles, which are at first convergent and then divergent, the flow quantity, as in the case of cylindrical or parallel-wall nozzles, remains limited to the value at which the velocity prevailing in the narrowest cross-section is that of sound. Contrary to the last-mentioned nozzles, in which the back-pressure cannot rise above the critical pressure at the mouth without the flow quantity diminishing, in the case of the Laval nozzle, however, a back-pressure far exceeding the critical pressure can be reached with practically no diminution in the flow quantity.

A constructional example of the subject of the invention is represented in the drawing, wherein:

FIGURE 1 shows an axial section through a radial bearing.

FIGURE 2 is a cross-section on the line II—II in FIGURE 1.

FIGURE 3 is a cross-section through a nozzle on a larger scale.

FIGURE 4 is furthermore a diagram showing the variation of the flow quantity through the nozzle and the bearing gap as a function of the nozzle back-pressure.

According to FIGURES 1 to 3, inserted in a bearing support 1 is an annular bearing member 2 embracing a shaft 3 with the clearance necessary for the passage of the bearing gas. The bearing member 2 is provided axially in its central plane with eight radial bores 4, distributed uniformly on the periphery and narrowing in the vicinity of the inner surface of the bearing member 2. In the remaining inner orifice of each bore 4 is inserted a nozzle member 5, the nozzle of which is formed as a Laval nozzle and opens into the bearing gap, denoted by $s$ in FIGURE 3, between the shaft 3 and the bearing member 2. The bores 4 are connected together by an annular channel 7 machined in the outer periphery of the bearing member 2. The bearing member 2 is sealed in the bearing support 1 by sealing rings 8.

The supporting gas from a source not shown, which supplies the gas at a pressure $p_0$, is admitted through a pipe 9 and a bore 10, passing radially through the bearing support 1, to the annular passage 7, and from the latter through the bores 4 and the Laval nozzles 6 to the bearing gap $s$. In the nozzle 6, the gas expands to a pressure $p_1$. After passing through the bearing gap, the gas escapes to the surroundings.

The advantages secured with the device described can be gathered from the diagram in FIGURE 4. The back-pressure $p_1$ of the nozzle or the inlet pressure of the bearing gap is plotted as abscissa and the weight $G_s$ of bearing gas flowing per second is plotted as ordinate. The curve $s_{min}$ shows the variation of the flow weight for minimum width of bearing gap, and the curve $s_{max}$, that on the opposite side. $p_0$ is the pressure in front of the nozzle.

If at the entry of the bearing gap $s_{min}$ a pressure $p^*$ is reached, which is comparatively very little below the pressure $p_0$, the point P* is obtained with the maximum flow weight G* per second. The minimum cross-section F of the Laval nozzle must be so selected that the flow curve above $p_1$, as back-pressure, passes through the point P*. The curve $a$ is obtained. Since, as already mentioned, the curve for the Laval nozzle is comparatively flat over a large range, the maximum flow quantity $G_0$ is only slightly greater than G*. A cylindrical nozzle with the same cross-section $F_1=F$ would give the curve $b_1$, which falls considerably even from relatively low pressures, and does not reach the point P*.

If, for the same conditions, it was desired to provide a cylindrical nozzle, it would be necessary to select one with a large cross-section $F_2$, which would give the curve $b_2$ passing through the point P* with a correspondingly large maximum quantity $G_2$.

The curve $s_{max}$ for the larger air gap of the unloaded opposite side intersects the curve $a$ at the point $Q_1$ and the curve $b_2$ at the point $Q_2$. The gas loss is therefore much greater for the cylindrical nozzle than for the Laval nozzle. It can also be gathered from FIGURE 4 that the curve $a$ at the point P* is much flatter than the curve $b_2$, which means that a small variation in the width of the bearing gap $s_{min}$ gives a much greater pressure variation in the case of the Laval nozzle than in the case of the cylindrical nozzle. The stabilising effect is therefore greater.

Instead of using, as shown, Laval nozzles of circular cross-section, gaps formed as Laval nozzles may also be provided with the same effect, particularly an annular gap extending round the bearing.

What is claimed is:

1. A gas pressure bearing structure having a bearing member and a supported member movable in relation to said bearing member along adjacent surfaces leaving a gap between one another, and at least one restricted passage for the supply of the pressure gas to said gap, said restricted passage being formed as a Laval nozzle.

2. A gas pressure bearing structure comprising a rotatable shaft; a stationary annular bearing member encircling said shaft so as to leave a gap between the bearing member and the shaft; and means for supplying pressure gas to the said gap, comprising at least one restricted passage being formed as a Laval nozzle.

3. The combination defined in claim 2 in which the said means for supplying the pressure gas comprise a series of circumferentially spaced Laval nozzles arranged in the bearing member and opening into the bearing gap.

References Cited in the file of this patent
UNITED STATES PATENTS

| | | |
|---|---|---|
| 2,223,242 | Sweet | Nov. 26, 1940 |
| 2,671,700 | Seyffert | Mar. 9, 1954 |

OTHER REFERENCES

Air Lubricated Bearings, "Product Engineering," 1953, Annual Handbook, pages J–2 through J–5 relied upon.